(12) United States Patent
Almpich et al.

(10) Patent No.: US 6,195,096 B1
(45) Date of Patent: *Feb. 27, 2001

(54) GRAPHICAL INTERFACE METHOD, APPARATUS AND APPLICATION FOR CREATING AND MODIFYING A MULTIPLE-VALUE TEXT LIST

(75) Inventors: Claudia C. Almpich; Joan Stagaman Goddard, both of Boulder, CO (US); Minh Trong Vo, Mountain View, CA (US); James Philip Wittig, Boulder; Rachel Youngran Yang, Superior, both of CO (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/696,745

(22) Filed: Aug. 14, 1996

(51) Int. Cl.[7] .................................................. G06F 13/00
(52) U.S. Cl. .......................................... 345/352; 345/346
(58) Field of Search .................................... 345/347, 350, 345/352, 353, 354, 975, 339, 340, 346, 146; 707/507, 508

(56) References Cited

U.S. PATENT DOCUMENTS

| | | | |
|---|---|---|---|
| 4,464,652 | 8/1984 | Lapson et al. | 340/710 |
| 5,001,654 | 3/1991 | Winiger et al. | 364/523 |

(List continued on next page.)

FOREIGN PATENT DOCUMENTS

| | | |
|---|---|---|
| 2097540 | 12/1994 | (CA) . |
| 0 587 394 A1 | 3/1994 | (EP) . |
| 0 622 728 A1 | 11/1994 | (EP) . |
| 4-361373 | 12/1992 | (JP) . |
| 5-313845 | 11/1993 | (JP) . |
| 6-4117 | 1/1994 | (JP) . |
| 6-215095 | 8/1994 | (JP) . |
| 7-129597 | 5/1995 | (JP) . |

OTHER PUBLICATIONS

Alan simpson, Mastering Wordperfect 5.1 & 5.2 for Windows, Sybex, pp. 417–419, 427–430, 445–446, Dec. 1993.*

DaVinci Email, Version 2.0 User's Guide, 1992, pp. 166–174.*

(List continued on next page.)

*Primary Examiner*—Ba Huynh
(74) *Attorney, Agent, or Firm*—David W. Victor; Konrad Raynes & Victor LLP

(57) ABSTRACT

Disclosed is an application program for revising a list of textual values, wherein the application is controlled by a computer system having at least a visual operator interface, an operating system for controlling the operation of program applications within the computer system, and memory for storing the application program. The application includes means for selecting a first window showing a user list box displaying a plurality of textual values. A first pushbutton may be selected from the first window to cause the display of a second window in which the user may enter a new textual value that is different from the plurality of textual values displayed in the first window. Another pushbutton in the second window may be used to display the first window with the textual values displayed including the new textual value. A pushbutton from the first window may be used to display a second value identical to the first textual value. Another pushbutton may then cause the display of the first window with the first and textual values displayed. An additional pushbutton from the first window may then be used to display a second window including a selected textual value to modify.

15 Claims, 8 Drawing Sheets

U.S. PATENT DOCUMENTS

| | | | |
|---|---|---|---|
| 5,062,060 | 10/1991 | Kolnick | 364/521 |
| 5,072,412 | 12/1991 | Henderson | 395/159 |
| 5,095,512 | 3/1992 | Roberts et al. | 382/56 |
| 5,117,372 | 5/1992 | Petty | 395/161 |
| 5,119,476 | 6/1992 | Texier | 395/157 |
| 5,121,477 | 6/1992 | Koopmans et al. | 395/156 |
| 5,140,677 | 8/1992 | Fleming et al. | 395/159 |
| 5,140,678 | 8/1992 | Torres | 395/159 |
| 5,164,911 | 11/1992 | Juran et al. | 364/578 |
| 5,206,950 | 4/1993 | Geary et al. | 395/600 |
| 5,208,907 | 5/1993 | Shelton et al. | 395/149 |
| 5,228,123 | 7/1993 | Heckel | 395/155 |
| 5,233,687 | 8/1993 | Henderson et al. | 395/158 |
| 5,247,651 | 9/1993 | Clarisse et al. | 395/500 |
| 5,249,265 | 9/1993 | Liang | 395/160 |
| 5,255,359 | 10/1993 | Ebbers e tal. | 395/161 |
| 5,276,901 | 1/1994 | Howell et al. | 395/800 |
| 5,287,447 | 2/1994 | Miller et al. | 395/157 |
| 5,307,451 | 4/1994 | Clark | 395/127 |
| 5,315,703 | 5/1994 | Matheny et al. | 395/164 |
| 5,317,687 | 5/1994 | Torres | 395/159 |
| 5,317,730 | 5/1994 | Moore et al. | 395/600 |
| 5,367,619 | 11/1994 | Dipaolo e al. | 395/149 |
| 5,371,844 | 12/1994 | Andrew et al. | 395/155 |
| 5,377,317 | 12/1994 | Bates et al. | 395/157 |
| 5,388,255 | 2/1995 | Pytlik et al. | 395/600 |
| 5,394,521 | 2/1995 | Henderson et al. | 395/158 |
| 5,404,439 | 4/1995 | Moran et al. | 395/155 |
| 5,410,695 | 4/1995 | Frey et al. | 395/650 |
| 5,410,704 | 4/1995 | Norden-Paul et al. | 395/700 |
| 5,412,776 | 5/1995 | Bloomfield et al. | 395/160 |
| 5,414,806 | 5/1995 | Richards | 395/135 |
| 5,416,900 | 5/1995 | Blanchard et al. | 395/155 |
| 5,418,950 | 5/1995 | Li et al. | 395/600 |
| 5,428,554 | 6/1995 | Laskoski | 364/554 |
| 5,428,776 | 6/1995 | Rothfield | 395/600 |
| 5,438,659 * | 8/1995 | Notess et al. | 345/340 |
| 5,450,545 | 9/1995 | Martin et al. | 395/700 |
| 5,454,071 | 9/1995 | Siverbrook et al. | 395/141 |
| 5,454,106 | 9/1995 | Burns et al. | 395/600 |
| 5,459,825 | 10/1995 | Anderson et al. | 395/133 |
| 5,459,832 | 10/1995 | Wolf et al. | 395/155 |
| 5,463,724 | 10/1995 | Anderson et al. | 395/148 |
| 5,473,745 | 12/1995 | Berry et al. | 395/157 |
| 5,479,599 | 12/1995 | Rockwell et al. | 395/155 |
| 5,481,666 | 1/1996 | Nguyen et al. | 395/159 |
| 5,483,651 | 1/1996 | Adams et al. | 395/600 |
| 5,487,141 | 1/1996 | Cain et al. | 395/135 |
| 5,491,795 | 2/1996 | Beaudet et al. | 395/159 |
| 5,497,454 | 3/1996 | Bates et al. | 395/158 |
| 5,497,484 | 3/1996 | Potter et al. | 395/600 |
| 5,600,774 * | 2/1997 | Spokrer | 395/174 |
| 5,694,549 * | 12/1997 | Carlin et al. | 395/200.2 |
| 5,784,177 * | 7/1998 | Sanchez et al. | 358/468 |

OTHER PUBLICATIONS

"Device Independent Graphics Using Dynamic Generic Operator Selection," *IBM Technical Disclosure Bulletin*, Apr. 1983, vol. 25, No. 11A, pp. 5477–5480.

"Error–Tolerant Dynamic Allocation of Command Processing Work Space," *IBM Technical Disclosure Bulletin*, Jun. 1984, vol. 27, No. 1B, pp. 584–586.

"Means for Computing the Max of a Set of Variables Distributed Across Many Processors," *IBM Technical Disclosure Bulletin,* Sep. 1990, vol. 33, No. 4, pp. 8–12.

"Graphical User Interface for the Distributed System Namespace," *IBM Technical Disclosure Bulletin*, Jul. 1992, vol. 35, No. 2, pp. 335–336.

"Graphical Query System," *IBM Technical Disclosure Bulletin*, Nov. 1993, vol. 36, No. 11, pp. 615–616

"Configuration Data Set Build Batch Program," *IBM Technical Disclosure Bulletin*, Nov. 1993, vol. 36, No. 11, p. 571.

Self–Contained Reusable Programmed Components, *IBM Technical Disclosure Bulletin*, Jul. 1995, vol. 38, No. 7, pp. 283–285.

"IBM Printing Systems Manager for AIX Overview," *International Business Machines Corporation*, Second Edition, Feb. 1996.

"IBM Printing Systems Manager for AIX Administrating," *International Business Machines Corporation*, 1995.

"Matching Three–Dimensional Objects Using a Relatinal Paradigm," *Pattern Recognition*, vol. 17, No. 4, pp. 385–405, 1984.

"A Multicolumn List–Box Container for OS/2," *Dr. Dobb's Journal*, May 1994, vol. 19, No. 5, pp. 90–94.

* cited by examiner

GRAPHICAL INTERFACE METHOD, APPARATUS AND APPLICATION FOR CREATING AND MODIFYING A MULTIPLE-VALUE TEXT LIST

BACKGROUND OF THE INVENTION AND STATE OF THE PRIOR ART

1. Field of the Invention

The present invention relates to graphical user interfaces. More particularly, the invention relates to a method, apparatus and application for creating and modifying a multiple-value text list.

2. Description of Related Art

In order to better understand the terms utilized in this patent application, a brief background definition section will be presented so that the reader will have a common understanding of the terms employed and associated with the present invention.

A "user interface" is a group of techniques and mechanisms that a person employs to interact with an object. The user interface is developed to fit the needs or requirements of the users who use the object. Commonly known user interfaces can include telephone push buttons or dials, or pushbuttons such as on a VCR or a television set remote. With a computer, many interfaces not only allow the user to communicate with the computer but also allow the computer to communicate with the user. These would include (1) command-line user interfaces (i.e., user remembered commands which he/she enters, e.g. "C:>DIR" in which "DIR" is a typical DOS command entered at the "C" prompt); (2) menu-driven user interfaces which present an organized set of choices for the user, and (3) graphical user interfaces, ("GUI") in which the user points to and interacts with elements of the interface that are visible, for example by a "mouse" controlled arrow or cursor.

An example of a GUI user interface is that which is offered by International Business Machines Corporation (IBM) under the name "Common User Access" ("CUA"). This GUI incorporates elements of object orientation (i.e., the user's focus is on objects and the concept of applications is hidden). Object orientation of the interfaces allow for an interconnection of the working environment in which each element, called an "object," can interact with every other object. The objects users require to perform their tasks and the objects used by the operating environment can work cooperatively in one seamless interface. With object oriented programming using a GUI, the boundaries that distinguish applications from operating systems are no longer apparent or relevant to the user.

In connection with this patent application, an "object" means any visual component of a user interface that a user can work with as a unit, independent of other items, to perform a task. By way of example, a spreadsheet, one cell in a spreadsheet, a bar chart, one bar in a bar chart, a report, a paragraph in a report, a database, one record in a database, and a printer are all objects. Each object can be represented by one or more graphic images, called "icons," with which a user interacts, much as a user interacts with objects in the real world. (NOTE: In the real world, an object might be an item that a person requires to perform work. As an example, an architect's objects might include a scale, T-square, and a sharp pencil, while an accountant's objects might include a ledger and a calculator.) However, it is not required that an object always be represented by an icon, and not all interaction is accomplished by way of icons.

While classification of objects may follow many different definitions, each class of objects has a primary purpose that separates it from the other classes. A class may be looked at as a group of objects that have similar behavior and information structures. In addition, each of the objects enumerated and defined below may contain other objects. There are three primary classes of objects. Each is discussed below.

(1) Container Object: This object holds other objects. Its principal purpose is to provide the user with a way to hold or group related objects for easy access or retrieval. An operating system, e.g. OS/2® (a trademark of IBM Corporation) or Windows® (a trademark of Microsoft Corporation), typically provides a general-purpose container, for example a folder or a program group—that holds any type of object, including other containers. For example, imagine a program group (or folder) labeled "PRIVATE FOLDER—ICONS". In the program group are three folder icons labeled "REPORTS", "PORTFOLIO" and "LETTERS". By selecting with a mouse or other pointing device the icon "PORTFOLIO", another window may open showing three more icons labeled "OIL PAINTINGS", "WATERCOLORS", and "PORTRAITS". In turn, selecting any of those three icons may open additional windows with further icons representing further subdivisions, or cross-references (e.g., "CUSTOMERS").

(2) Data Objects: The principal purpose of a data object is to convey information. This information may be textual or graphical information or even audio or video information. For example, a business report displayed on the computer monitor may contain textual information concerning sales of "gadgets" over the past few years (text object) to all customers and also may contain a bar chart (graphic object) to pictorially depict, on the same monitor screen, the sales information.

(3) Device Objects: The principal purpose of a device object is to provide a communication vehicle between the computer and another physical or logical object. Many times the device object represents a physical object in the real world. For example, a mouse object or icon can represent the user's pointing device, and a modem object can represent the user's modem, or a printer object or icon can represent the user's printer. Other device objects are purely logical, e.g. an out-basket icon representing outgoing electronic mail; a wastebasket object or icon representing a way the user may "trash" or dispose of other objects.

As can be seen from the foregoing, a class of objects may be defined as a description of the common characteristics of several objects, or a template or model which represents how the objects contained in the class are structured. While there are further ways in which to define objects and classes of objects, typically each class of objects will include similar attributes, the values of which the user will alter, modify, replace or remove from time to time. For a more complete discussion of objects, attributes, object oriented interfaces etc. see "Object Oriented Interface Design: IBM Common User Access" (published by Que, ISBN 1-56529-170-0).

The present invention relates primarily to data objects. In a graphical user interface, the user frequently desires to construct a list of values. In addition to creating the list, the user typically wants to modify the list, once created, by adding, deleting, or modifying values. Moreover, it is useful for the user to be able to copy values within the list.

There are no standard solutions to these needs in the field of graphical user interfaces. Of course a variety of database products exist that provide various data management options. However, within graphical user interfaces there are no known solutions that adequately meet user needs.

SUMMARY OF THE INVENTION

In view of the above, it is a principal object of the present invention to provide a graphically oriented method, application and apparatus to construct a list of values.

Another object of the present invention is to permit the user to modify a list of values.

Yet another object of the present invention is to permit the user to copy selected values from one entry to another.

Still another object of the present invention is to provide an application which may be employed in a number of different computers, may be transported between different computers, and may be loaded into various computer environments.

The invention is carried out in the following environment. The computer system has at least a visual operator interface, an operating system for operating applications within the computer system, and memory for storing at least part, preferably all, of an application. The present invention provides a method, apparatus, and application for constructing in a graphical user interface a list of values. Also disclosed is a means for adding, modifying, and deleting values. Additionally disclosed is a means for copying selected values within the list.

Other objects of the invention and a more complete understanding of the invention may be had by referring to the following description taken in conjunction with the accompanying drawings.

BRIEF DESCRIPTION OF THE DRAWING(S)

DESCRIPTION OF THE ILLUSTRATIVE EMBODIMENT(S)

Figure 1:
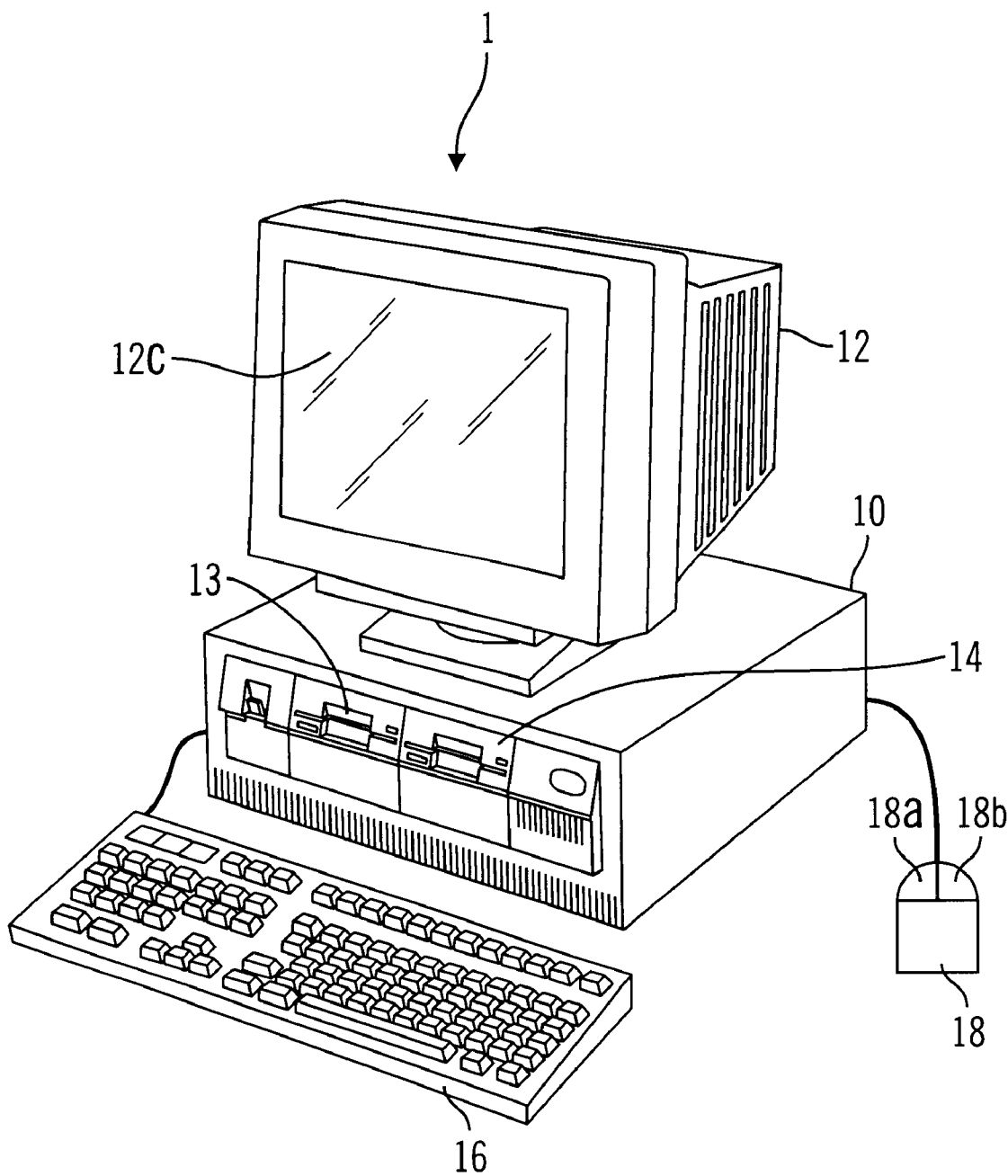
FIG. 1 illustrates a typical desktop computer system which may be employed to practice the novel method and application of the present invention.
Figure 2:
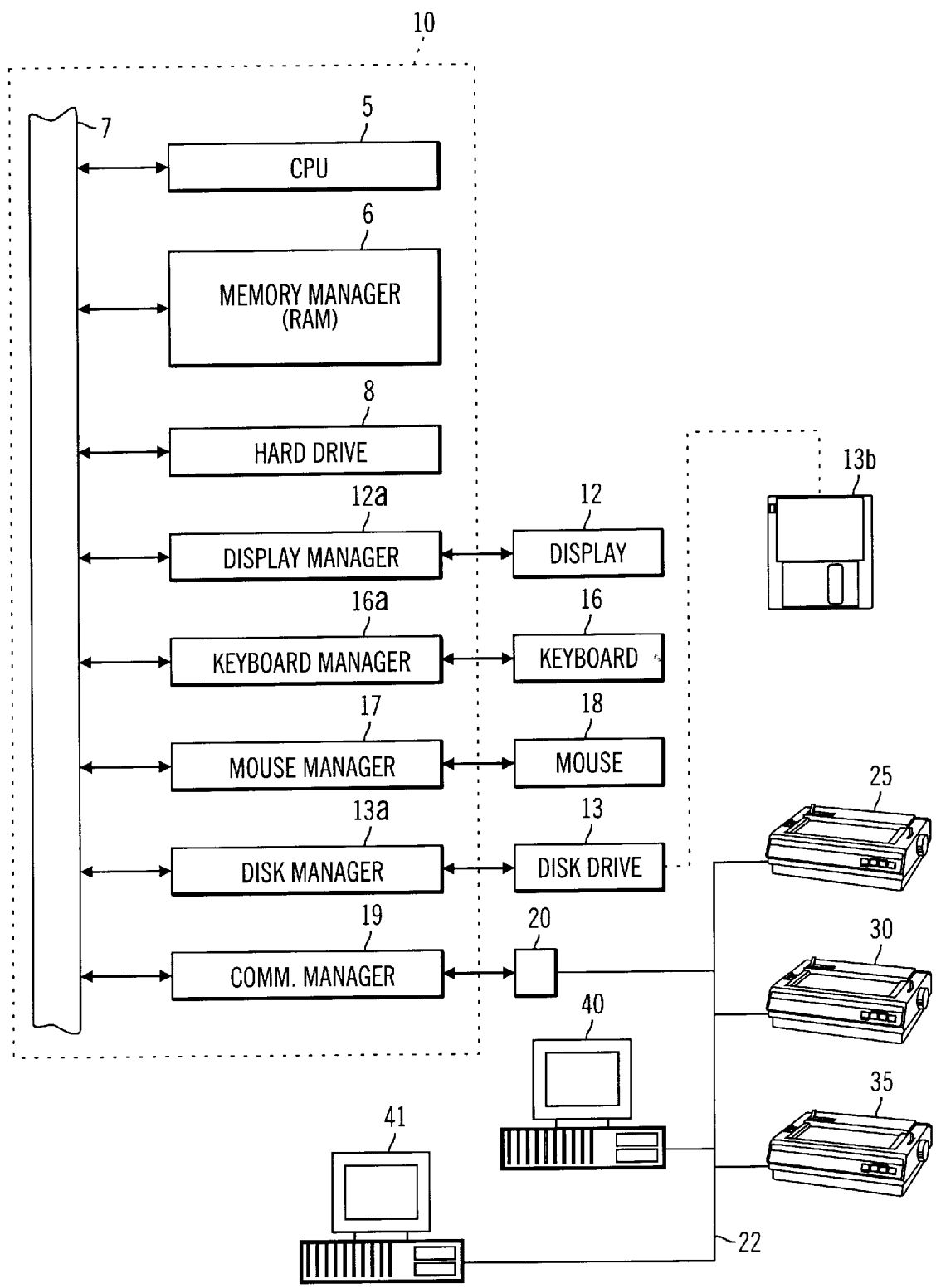
FIG. 2 is a block diagram illustrating a sample configuration of the computer system shown in FIG. 1.

Turning now to the drawings, and especially FIGS. 1 and 2, FIG. 1 diagrammatically shows a computer system 1 which may be connected to a Local Area Network system (LAN 20) as shown in FIG. 2.

As shown in FIG. 1, the computer system 1 comprises a main chassis 10, a display means or monitor 12, a connected keyboard 16 and a pointing device, in the present instance a mouse 18 which is operator controlled to move a pointer cursor 12b (shown in FIG. 3) on the display or monitor screen 12c. As shown in FIG. 2, the chassis 10 includes a central processing unit, or "CPU" 5, a memory manager and associated random access memory, or "RAM" 6, a fixed disk or hard drive 8 (which may include its associated disk controller), a display manager 12a which is connected externally to the chassis 10 of the display 12; a keyboard manager 16a, which through flexible cable (not shown) is connected to the keyboard 16; a mouse manager 17 (which in some instances may form part of the display manager 12a, and may be in the form of a software driver) for reading the motion of the mouse 18 and its control mouse buttons (MB) 18a and 18b, shown in FIG. 1. A disk manager or controller 13a which controls the action of the disk drive 13 (and an optional drive such as a magneto-optical or CD ROM drive 14) shown in FIG. 1, rounds out most of the major elements of the computer system 1.

The pointer element or cursor 12b can be moved over the display screen 12c by movement of the mouse 18. The mouse buttons (MB) 18a and 18b give commands to the operating system, usually through a software mouse driver provided by the mouse manufacturer. With the first mouse button (MB) 18a the operator can select an element indicated on the display screen 12c using the pointer or cursor 12b, i.e., signify that an action subsequently to be performed is to be carried out on the data represented by the indicated element on the display screen 12c. The system normally gives some visual feedback to the operator to indicate the element selected, such as a change in color, or a blocking of the icon. The second mouse button (MB) 18b may be a menu button, if desired. Conventionally, when the operator presses button 18b, a selection menu or dialog with system commands will appear on the display screen 12c. The operator may select an icon or item from the selection menu or input information into the dialog box as appropriate using the cursor 12b and the first mouse button (MB) 18a. Some menu items, if selected, may call up another menu or submenu for the operator to continue the selection process.

The use of a mouse and selection menus is well known in the art, for example U.S. Pat. No. 4,464,652 to Lapson et al. describes a selection menu of the pull-down type in combination with a mouse. It should be recognized, of course, that other cursor pointing devices may be employed, for example a joystick, ball and socket, or cursor keys on the keyboard.

The foregoing devices (and software drivers therefore) within the chassis 10 communicate with one another via a bus 7. To round out the computer system 1, an operating system (not shown) must be employed. If the computer system is a typical IBM-based system, the operating system may be DOS-based and include a GUI interface such as contained in OS/2®, or WINDOWS®, or other operating system of choice. If the computer system is based upon RISC (reduced instruction set computer) architecture, then the operating system employed may be, in the instance of an IBM-based RISC architectured System/6000®, AIX. Alternatively, if the computer system 1 is a large host computer, such as a an IBM 3090, it may be running an operating system such as MVS or VM.

In the illustrated instance, the computer system 1 includes an I/O (Input/Output) manager or communications manager 19 (shown in FIG. 2) which serves to link the computer system for communications with the outside world such as to a systems printer, a modem or a LAN controller (such as a Token ring or ETHERNET or even through a modem employing SDLC) such as shown at 20 in FIG. 2. The LAN controller may be incorporated inside the computer system 1 or located externally as shown diagrammatically in FIG. 2, as desired. The LAN controller 20 may connect to other computer systems 40 and 41 as well as to other printers such as printers 25, 30 and 35 by communications cable 22 and the like. However the method and application of the present invention works equally well with multiple objects serviced by a single computer system.

Figure 3:
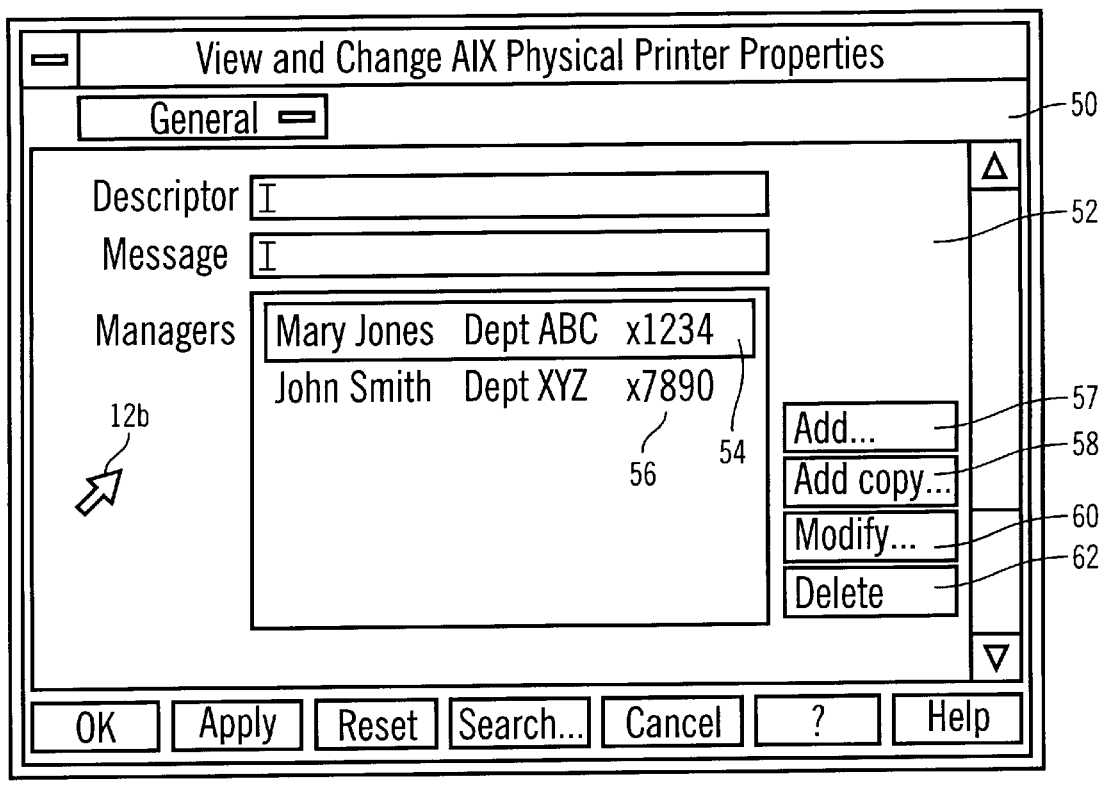
FIG. 3 is a typical window, in accordance with the present invention, showing a list of textual values in a user-list box.

Referring now to FIG. 3, the display screen 12c of the monitor 12 is shown with a window 50. As illustrated, a user-list box 52 contains two text entries, 54 and 56.

The Add Pushbutton 57 is selected to add a value (i.e., a new entry) to the user-list box 52. The Add Copy Pushbutton 58 is selected to copy a value from the user-list box 52 to create another entry in the user-list box 52. The Modify Pushbutton 60 is selected to modify an existing value in the user-list box 52. The Delete Pushbutton 62 is selected to delete an existing value in the user-list box 52. The operation of each of these pushbuttons is described in further detail below.

Figure 4:
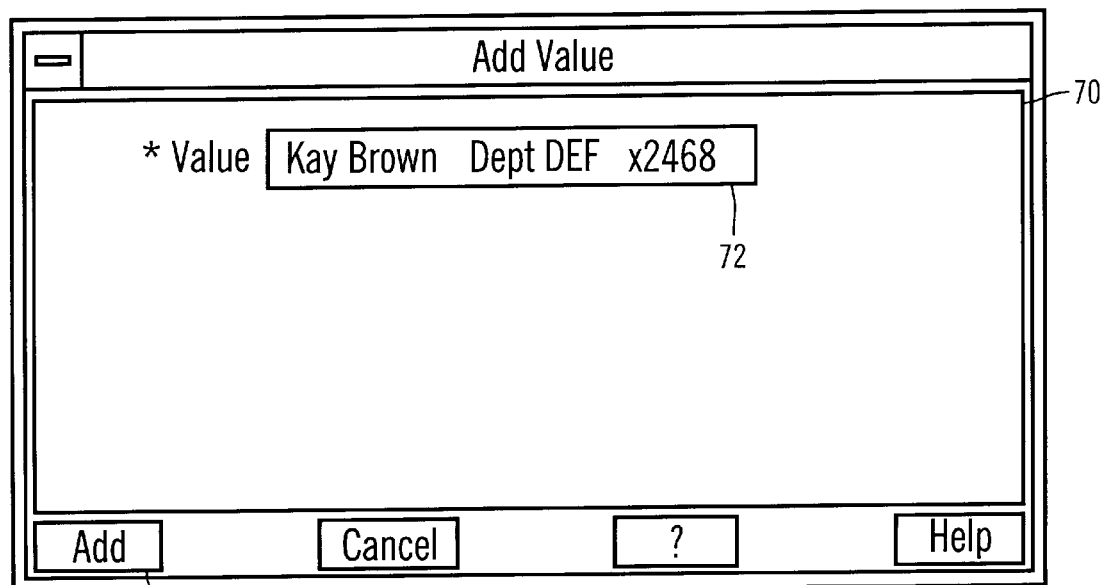
FIG. 4 is a typical window showing how new values are added to the user-list of values.
Figure 5:
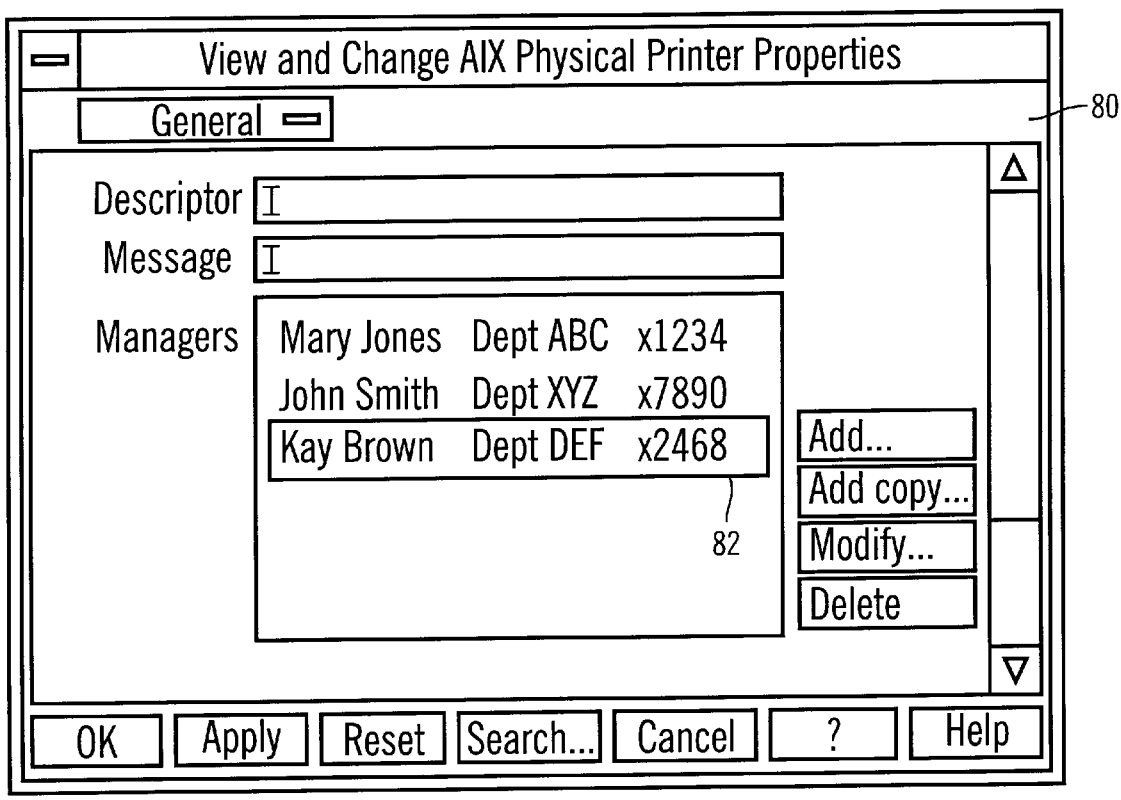
FIG. 5 is a typical window showing the added values in the user-list box.

FIG. 4 shows a typical window 70 to demonstrate how values are added to the user-list box 52. When the user selects the Add Pushbutton 57 in the window 50 in FIG. 3, the window 70 appears. The window 70 contains a Value Box 72. To add a value to the user-list box 52, the user enters the new value in Value Box 72. The user then selects the Add Pushbutton 74 at the bottom of window 70. The window 70 then closes and, as shown in FIG. 5, the window 80 appears. Window 80 is identical to window 50, except that the value 82 added in window 70 is shown in the user-list box 52.

Figure 6:
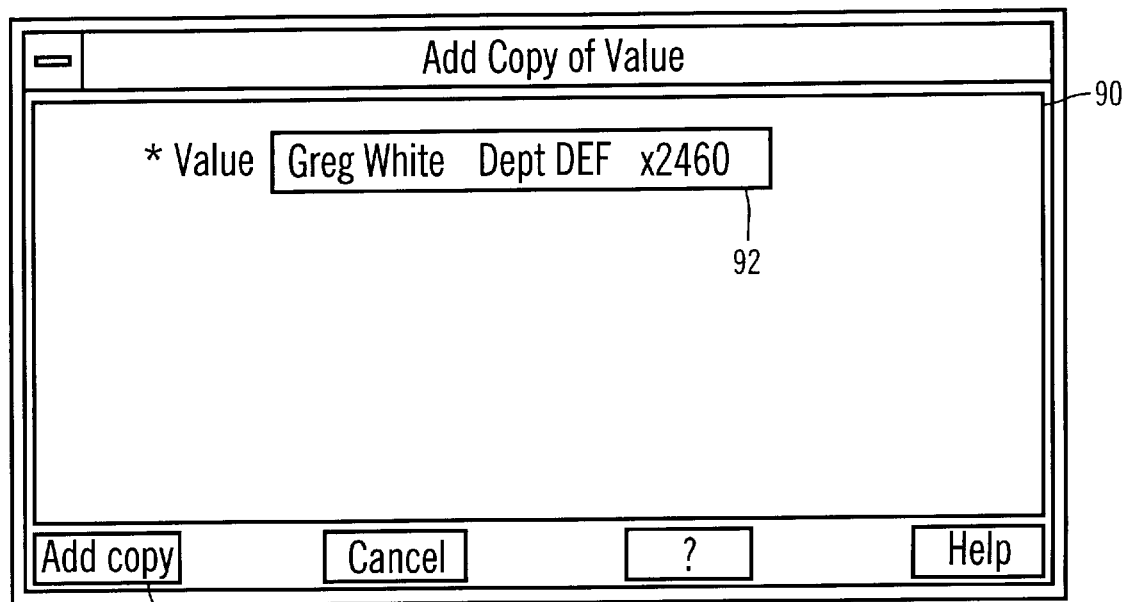
FIG. 6 is a typical window showing the copying of a value already in the list box, and then modification of the copy.

Assume now that the user desires to copy value 82 to create a fourth entry in user-list box 52. The user selects Add Copy Pushbutton 58. This causes window 90 to appear, as shown in FIG. 6. As can be seen in FIG. 6, value 82 has been "pre-filled in" to the Value Box 92 on window 90. If the user then desires to make certain modifications to the value this can be done without the user having to re-enter all of the information for the value 82.

Figure 7:
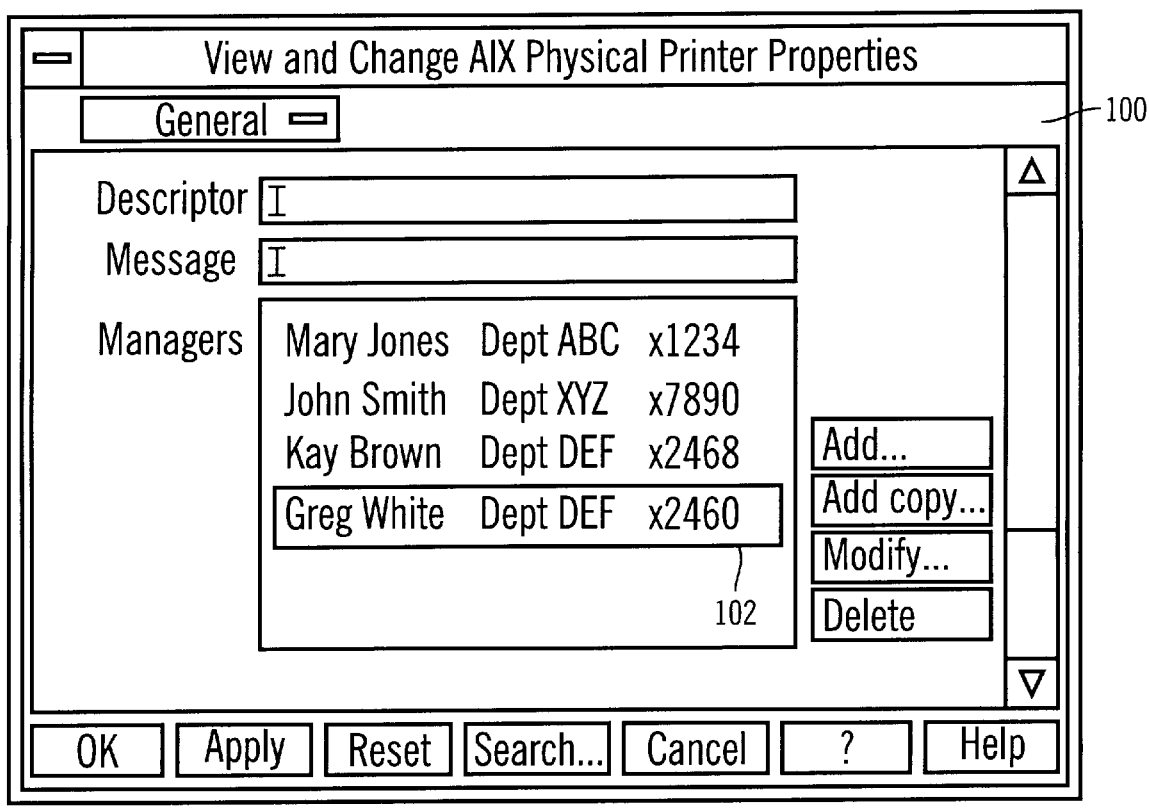
FIG. 7 is a typical window showing the added copy, as modified, in the user-list box.

When the modifications are complete, the user selects the Add Copy Pushbutton 94. This causes window 100 to appear, as shown in FIG. 7. As shown in FIG. 7, the new value 102 has been added to the user-list box 52.

Now suppose the user desires to modify value 102. The user selects the Modify Pushbutton 60. This causes the window 110 shown in FIG. 8 to appear. Window 110 contains a Value Box which is "pre-filled-in" to correspond with the information for value 102 showing in the user-list box 52 and as previously entered by the user. The user can make minor changes to the value in the Value Box 112.

Figure 8:
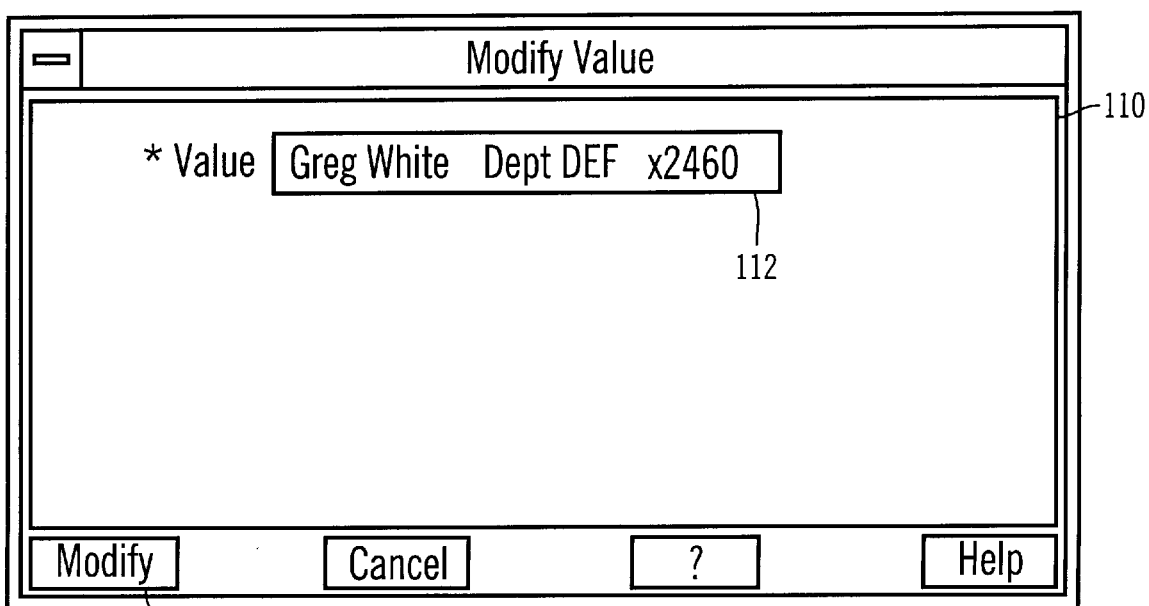
FIG. 8 is a typical window showing the modification of existing textual values in the user-list box.
Figure 9:
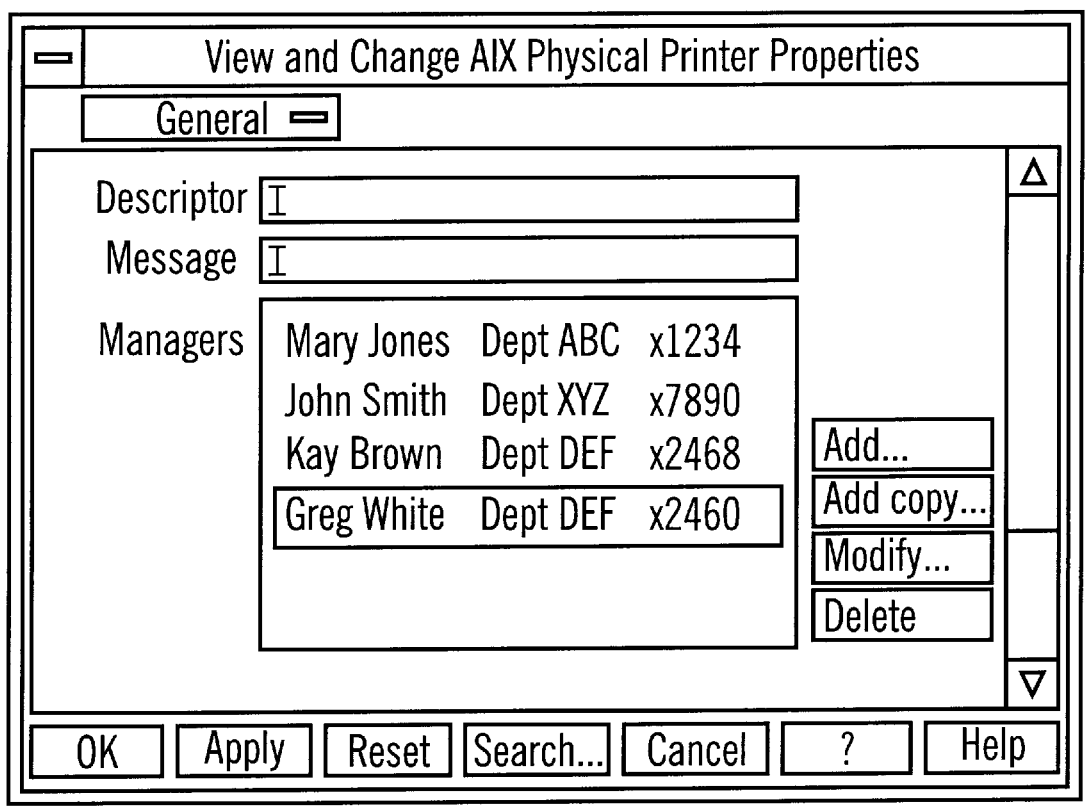
FIG. 9 is a typical window showing the modified value in the user-list box.

When the modifications are complete, the user selects the modify pushbutton 114 as shown in FIG. 8. FIG. 9 shows user-list box 52 with value 102 modified as shown in Value Box 112 in FIG. 8.

Although not illustrated in the Figures, the user also can delete a value in the user-list box 52. To delete a value, the Delete Pushbutton 62 is selected.

Figure 10A:
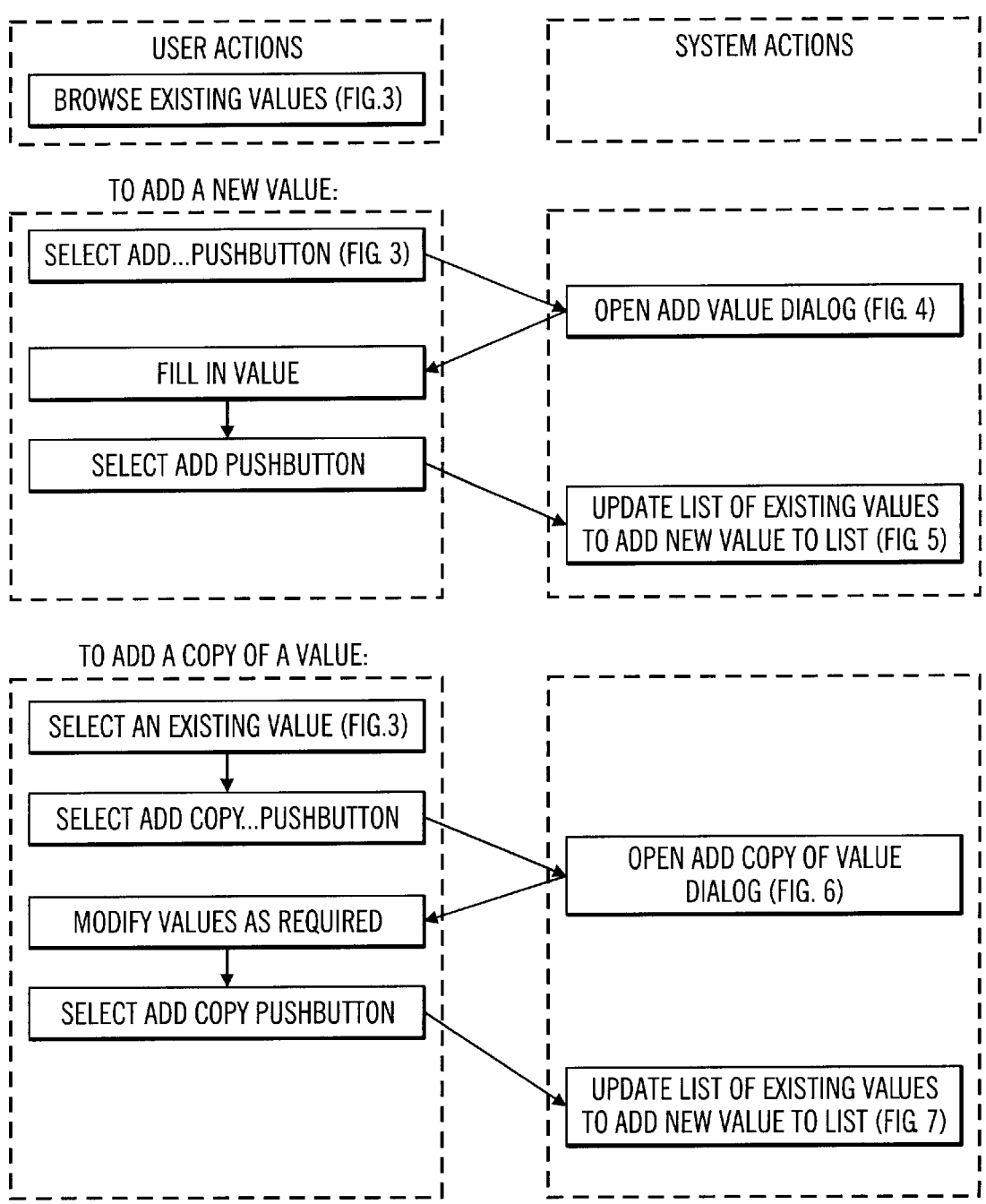
FIGS. 10A and 10B is a flow chart illustrating the method of the present invention, including FIG. 10A and FIG. 10B.
Figure 10B:
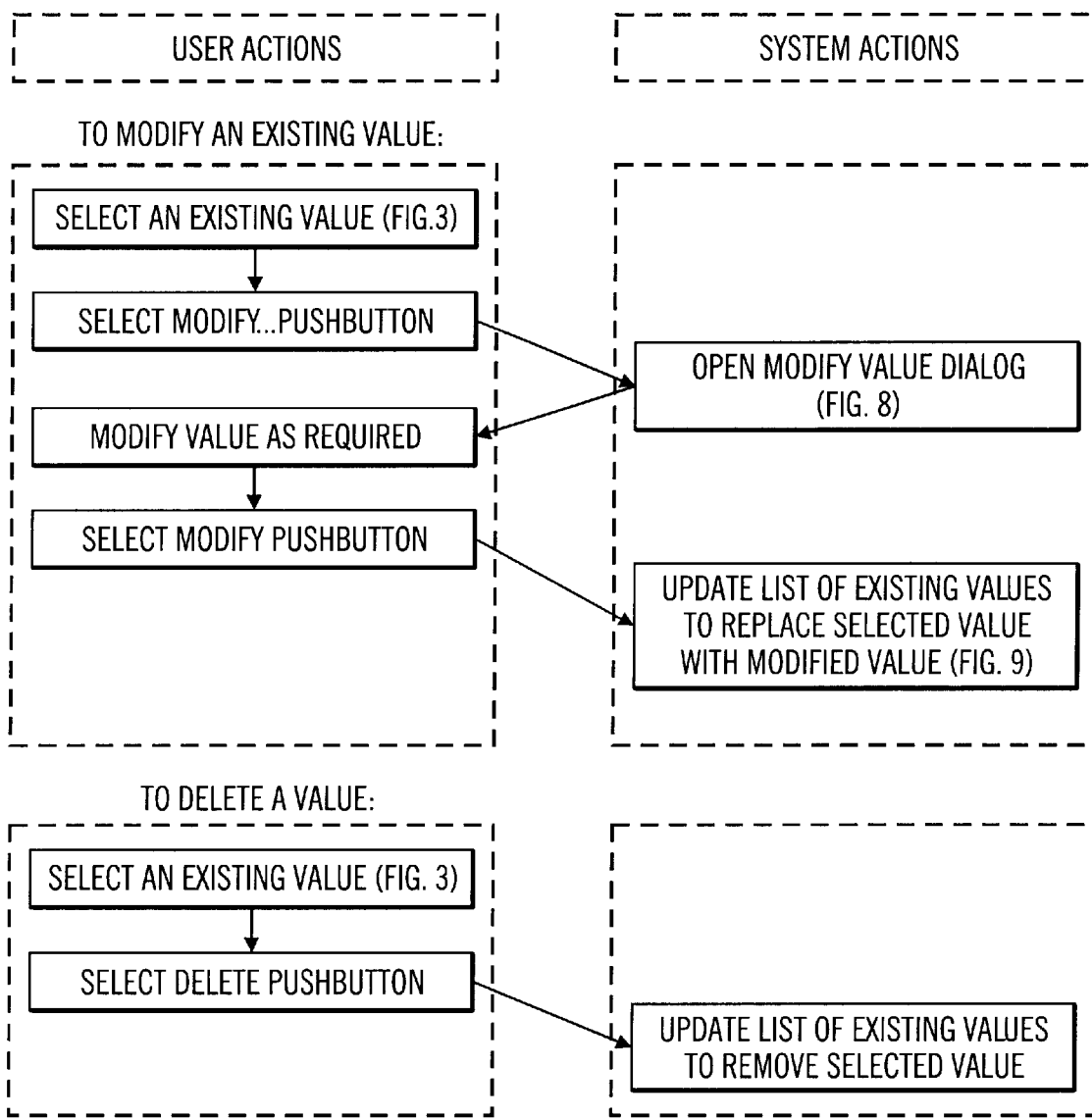

FIG. 10 shows the method of the present invention.

Although the invention has been described with a certain degree of particularity, it should be recognized that elements thereof may be altered by person(s) skilled in the art without departing from the spirit and scope of the invention. The invention is limited only by the following claims and their equivalents.

What is claimed is:

1. A computer system for copying textual values in a list, comprising:
   a display device;
   an input device for entering user commands and data into the computer system;
   program logic executed by the computer system in response to receiving user commands and data from the input device, including;
   means for displaying on the display device a first window showing a user-list box including a plurality of textual values;
   means for receiving input from the input device indicating selection of a first textual value from the textual values displayed in the first window;
   means for receiving input from the input device indicating selection of a first selectable graphical element displayed on the display device to cause the display of a second window showing a second textual value, wherein the first and second textual values are identical textual values;
   means for receiving input from the input device to modify the second textual value, wherein the first textual value and modified second textual values are different values;
   means for dislplaying the first window with the first and modified second textual values displayed as entries in the user-list box, wherein the first textual value is unchanged;
   means for receiving input from the input device indicating a selected second selectable graphical element to cause the display of a third window in which a textual value may be entered;
   means for receiving data from the input device for a new textual value in the third window that is different from the plurality of textual values displayed in the first window; and
   means for selecting a third selectable graphical element to cause the display of the first window with the textual values displayed including the new textual value, wherein the second selectable graphical element is displayed in the first window and the third selectable graphical element is displayed in the third window.

2. The computer system of claim 1, wherein the program logic further comprises:
   means for receiving input from the input device indicating selection of a textual value to be modified from the first window;
   means for receiving input from the input device indicating selection of a fourth selectable graphical element to view a fourth window displaying the selected value;
   means for receiving input from the input device indicating modifications to the selected textual value displayed in the fourth window; and
   means for receiving input from the input device indicating selection of a fifth selectable graphical element to accept the modifications to the selected textual value made in the fourth window and to display the first window with the modified textual value displayed in the user-list box displayed in the first window.

3. The application of claim 2, further comprising:
   means for selecting a delete pushbutton causing the selected value to be deleted from the user-list box.

4. The application program of claim 1, further causing the computer system to perform the step of selecting a fourth selectable graphical element, in response to input from the visual operator interface, after receiving input indicating modifications to the second textual value to cause the first window to appear with the first and second modified textual values displayed in the user-list box.

5. The computer system of claim 1, further comprising means for selecting a fourth selectable graphical element after receiving input indicating modifications to the second textual value to cause the first window to appear with the first and second modified textual values displayed in the user-list box.

6. The computer system of claim 1, wherein the first selectable graphical element is displayed in the first window.

7. An application program for use in programming a computer system to manage textual values in a list in response to user input, the application program comprising a computer usable medium accessible to the computer system, wherein the computer usable medium has at least one computer program that causes the computer system to receive user input via a visual operator interface and, in response thereto, perform the steps of:

displaying a first window showing a user-list box including a plurality of textual values;

selecting, in response to user input from the visual operator interface, a fist textual value from said first window;

selecting, in response to user input from the visual operator interface, a first selectable graphical element to view a second textual value, wherein the first and second values are identical textual values;

receiving input to modify the second textual value displayed in the second window, wherein the first textual value and modified second textual value are different values; and displaying the first window with the first and modified second textual values displayed as entries in the user-list box, wherein the first textual value is unchanged;

selecting, in response to input from the visual operator interface, a second graphical element to cause the display of a third window in which a textual value may be entered;

receiving data indicating a new textual value in the third window that is different from the plurality of textual values displayed in the first window; and selecting, in response to input from the visual operator interface, a third graphical element to cause the display of the first window with the textual values displayed including the new textual value, wherein the second selectable graphical element is displayed in the first window and the third selectable graphical elements is displayed in the third window.

8. The application program of claim 7, further causing the computer system to perform the steps of:

selecting, in response to input from the visual operator interface, a textual value to be modified from the first window;

selecting, in response to input from the visual operator interface, a fourth selectable graphical element to view a fourth window displaying the selected value;

selectively modifying, in response to input from the visual operator interface, the selected textual value displayed in the fourth window; and selecting, in response to input from the visual operator interface, a fifth selectable graphical element to accept the modifications to the selected textual value made in the fourth window and to cause the display the first window with the modified textual value displayed in the user-list box displayed in the first window.

9. The application program of claim 7, further causing the computer system to perform the step of selecting, in response to input from the visual operator interface, a delete pushbutton causing the selected value to be deleted from the user-list box.

10. The application program of claim 7, wherein the first selectable graphical element is displayed in the first window.

11. A method for copying textual values in a list as controlled by a computer system having at least a visual operator interface, an operating system for controlling the operation of program applications within the computer system, and memory means for storing an application, the method comprising the steps of:

displaying a first window showing a use-list box displaying a plurality of textual values;

selecting, in response to user input from the visual operator interface, a first textual value from said first window;

selecting, in response to user input from the visual operator interface, a first graphical element to cause the display of a second window showing a second textual value, wherein the first and second textual values are identical textual values;

receiving input to modify the second textual value displaced in the second window, wherein the first and second modified textual values are different values;

displaying the first window with the first and modified second textual values displayed as entries in the user-list box, wherein the first textual value is unchanged;

selecting a second selectable graphical element to cause the display of a third window in which a textual value may be entered;

entering a new textual value in the third window that is different from the plurality of textual values displayed in the first window; and selecting a third selectable graphical element to cause the display of the first window with the textual values displayed including the new textual value, wherein the second selectable graphical element is displayed in the first window and the third selectable graphical element is displayed in the third window.

12. The method of claim 11, further comprising the steps of:

selecting a textual value to be modified from the first window;

selecting a fourth selectable graphical element to view a fourth window displaying the selected value;

selectively modifying the selected textual value displayed in the fourth window; and selecting a fifth selectable graphical element to accept the modifications to the selected textual value made in the fourth window and to display the first window with the modified textual value displayed in the user-list box displayed in the first window.

13. The method of claim 12, further comprising the step of:

selecting a delete pushbutton causing the selected value to be deleted from the user-list box.

14. The method of claim 11, further comprising the step of selecting a fourth selectable graphical element after receiving input indicating modifications to the second textual value to cause the first window to appear with the first and second modified textual values displayed in the user-list box.

15. The method of claim 11, wherein the first selectable graphical element is displayed in the first window.

* * * * *

UNITED STATES PATENT AND TRADEMARK OFFICE
CERTIFICATE OF CORRECTION

PATENT NO. : 6,195,096 B1
DATED : February 27, 2001
INVENTOR(S) : Claudia C. Alimpich et al.

It is certified that error appears in the above-identified patent and that said Letters Patent is hereby corrected as shown below:

<u>Column 6,</u>
Line 50, repalce "The application of" with -- The computer system of -- .
Line 53, repalce "The application program of" with -- The computer system of --.

Signed and Sealed this

Twenty-eighth Day of June, 2005

JON W. DUDAS
*Director of the United States Patent and Trademark Office*